US007010673B2

(12) United States Patent
Svensson et al.

(10) Patent No.: US 7,010,673 B2
(45) Date of Patent: Mar. 7, 2006

(54) APPARATUS AND METHOD FOR PROCESSING PIPELINED DATA

(75) Inventors: Lars-Olov Svensson, Stockholm (SE); Joachim Roos, Nacka (SE); Thomas Strömqvist, Solna (SE); Pär Westlund, Stockholm (SE); Peter Holm, Stockholm (SE)

(73) Assignee: Xelerated AB, Stockholm (SE)

( * ) Notice: Subject to any disclaimer, the term of this patent is extended or adjusted under 35 U.S.C. 154(b) by 106 days.

(21) Appl. No.: 10/470,096

(22) PCT Filed: May 21, 2001

(86) PCT No.: PCT/SE01/01134

§ 371 (c)(1),
(2), (4) Date: Dec. 23, 2003

(87) PCT Pub. No.: WO02/059767

PCT Pub. Date: Aug. 1, 2002

(65) Prior Publication Data

US 2004/0133673 A1    Jul. 8, 2004

(30) Foreign Application Priority Data

Jan. 25, 2001    (SE) .................................. 0100221

(51) Int. Cl.
*G06F 15/80* (2006.01)
(52) U.S. Cl. ..................................... 712/227
(58) Field of Classification Search ............... 712/227, 712/225; 709/250; 370/401
See application file for complete search history.

(56) References Cited

U.S. PATENT DOCUMENTS

| 5,261,063 A | * | 11/1993 | Kohn et al. ............... 712/229 |
| 5,524,258 A |   | 6/1996  | Corby et al. .............. 712/19 |
| 5,566,170 A |   | 10/1996 | Bakke et al. ............. 370/392 |
| 5,666,487 A | * | 9/1997  | Goodman et al. .......... 709/246 |
| 5,951,649 A |   | 9/1999  | Dobbins et al. ........... 709/238 |
| 6,038,350 A | * | 3/2000  | Iwase et al. ............. 382/304 |
| 6,252,610 B1 | * | 6/2001  | Hussain ................. 345/506 |
| 6,393,026 B1 | * | 5/2002  | Irwin .................... 370/401 |
| 6,779,041 B1 | * | 8/2004  | Yoo et al. ............... 709/247 |
| 6,836,808 B1 | * | 12/2004 | Bunce et al. ............. 710/20 |

FOREIGN PATENT DOCUMENTS

WO    WO 9745795    12/1997

OTHER PUBLICATIONS

Treleaven, P.C., etal. "Data-Driven and Demand-Driven Computer Architecture", Computing Surveys, vol. 14, No. 1, Mar. 1982, pp. 93-143.*

* cited by examiner

*Primary Examiner*—Eric Coleman
(74) *Attorney, Agent, or Firm*—Albihns Stockholm AB

(57) ABSTRACT

Apparatus (3) for processing pipelined data, comprises a storage unit and at least one logic unit (11) for executing operations on a block (4) of data. The storage means comprises an instruction table (12a) comprising at least one instruction, and the at least one logic unit (11) is in at least one pipelined processing stage adapted to receive the block (4) and a first instruction (13a) of the at least one instruction and execute the first instruction (13a). The invention also relates to a method for processing pipelined data, a module (1) for processing pipelined data, an integrated circuit (15), a circuit board assembly (16), a computer unit (22) and a pipelined processing system.

18 Claims, 4 Drawing Sheets

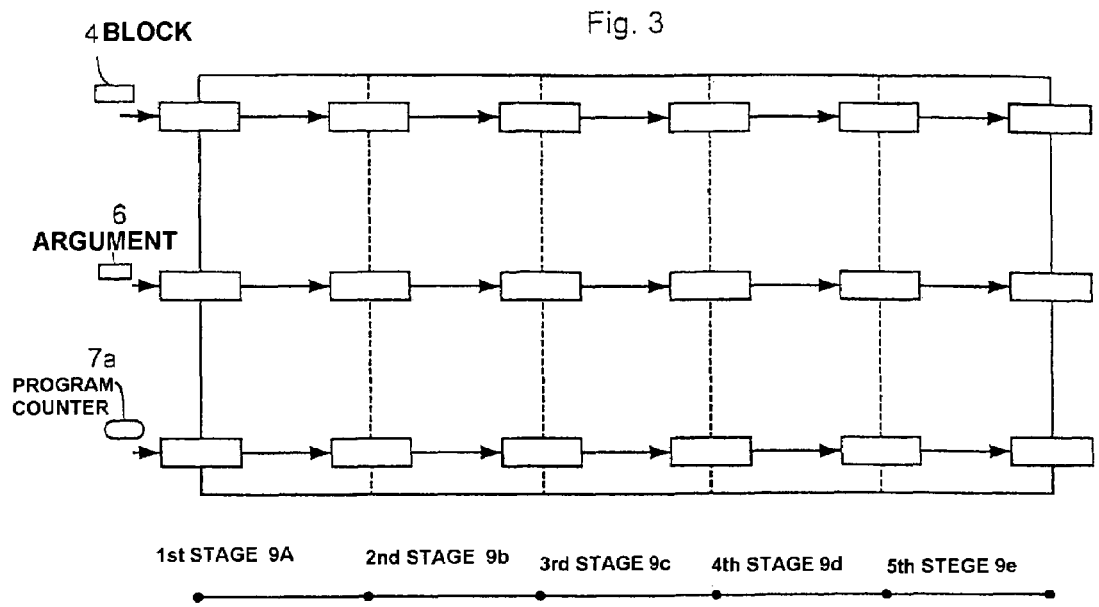
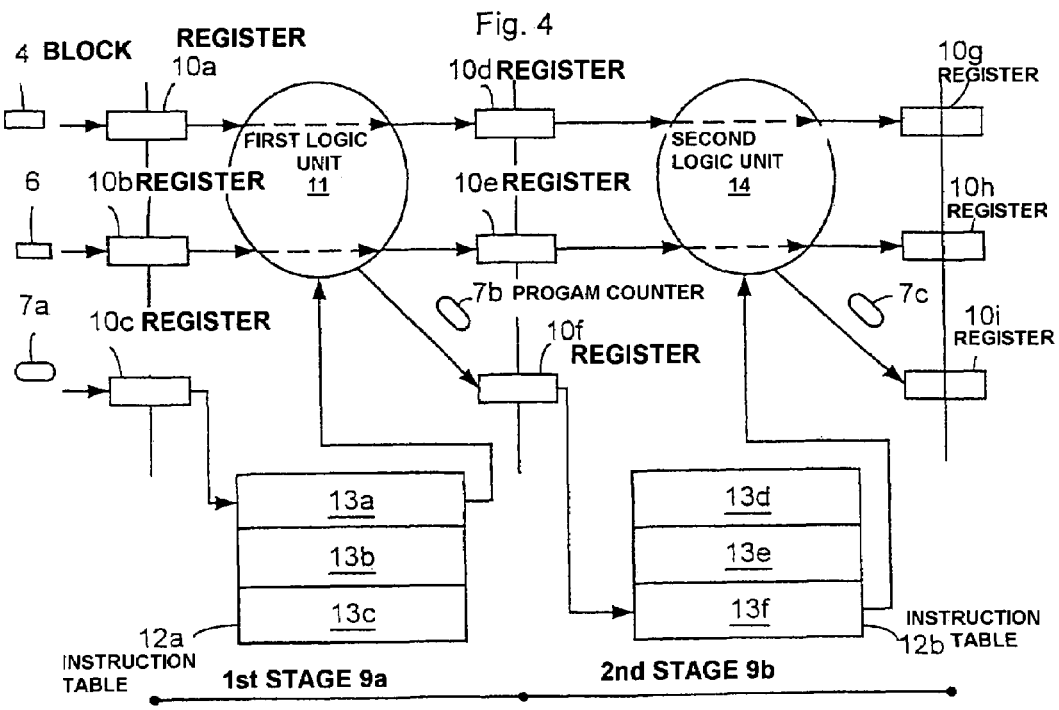

APPARATUS AND METHOD FOR PROCESSING PIPELINED DATA

TECHNICAL FIELD OF THE INVENTION

The present invention relates to a method for processing pipelined data, a processing means for pipelined data, a module for processing pipelined data, an integrated circuit, a circuit board assembly, a computer unit and a pipelined processing system.

DESCRIPTION OF RELATED ART

Many processors use a technique called pipelining or pipelined processing, where the processors begin to execute a second instruction before a first instruction has been completed, That is, several instructions are in a "pipeline" simultaneously, each at a different processing stage. The pipeline is divided into stages, i.e. segments, and each stage can execute its operations, i.e. defined actions associated with an instruction, concurrently with the other stages. When a stage completes an operation, it passes the result to the next stage in the pipeline and obtains the next operation from the preceding stage. The final results of each instruction emerge at the end of the pipeline in rapid succession.

Not only high performance and RISC (Reduced Instruction Set Computer) based microprocessors use instruction pipelining. RISC gives a high programmability for the instructions performed by the microprocessor and higher demands on the software than for CISC (Complex Instruction Set computer) based microprocessors. Although RISC-based microprocessors have a faster clock frequency than CISC-based microprocessors, they are slower for certain special purposes, for which a CISC may be configured. However, generally for special purposes, both the RISC and the CISC are slower than ASIC (Application Specific Integrated Circuit), since the ASIC is especially adapted for a specific purpose. Since the ASIC is optimised for a specific, predetermined work, it has the disadvantage of not being adapted for other purposes and thereby lacking the flexibility of the general-purpose microprocessors. U.S. Pat. No. 6,157,955-A discloses a general-purpose programmable packet-processing platform for accelerating network infrastructure applications. Acceleration is achieved by e.g. dividing the steps of the packet processing into a multiplicity of pipeline stages and providing custom, specialised classification engines and a general-purpose microprocessor, called a policy processor, for executing the arbitrary actions desired by certain applications. However, the policy processor has to perform the desired action before an execution of a subsequent, requested action is able to begin.

SUMMARY

It is a general object of the present invention to provide a computer architecture that for specific applications allows faster instruction execution than generally RISC- and CISC-based microprocessors and that is more flexible than an ASIC regarding programmability.

The present invention therefore provides a method for pipelined processing. The method comprises at least one pipelined processing stage, which comprises the steps of:
  receiving a block and a first program counter, i.e. a variable used to keep track of the address of the next instruction, in a processing means, where the first program counter is associated with the block;
  looking up, i.e. selecting within a predefined table of values (array, matrix, etc), a first instruction corresponding to the first program counter in an instruction table comprising at least the first instruction; and
  executing at least one operation associated with the first instruction in a logic unit. Hereby is achieved that every stage in the pipelined processing of incoming blocks is associated with an instruction table, in which an instruction specified for an application is editable so as to custom-configure each stage for a specific application.

Suitably, the at least one pipelined processing stage comprises the step of:
  receiving at least one argument, i.e. a variable, in the processing means, where the at least one argument is associated with the block; and
  the executing of the at least one operation in the logic unit is performed on the at least one argument, the block or both the at least one argument and the block.

Hereby is achieved that more complex and different instructions may be programmed in the instruction table.

Preferably, before the above mentioned stage or stages, the method comprises the steps of:
  receiving a search vector associated with the block in a classification means;
  comparing the search vector with data stored in an associative storage, the data comprising the first program counter and the at least one argument; and
  sending the at least one argument and the first program counter to the processing means before the at least one processing stage.

Hereby a classification stage before the, processing stage is achieved, wherein the at least one argument and the first program counter, which may be different for each type of block that is sent to the classification means, determine a possible modification of the block in the first stage in the processing means. The associative storage, i.e. a storage that is accessed by comparing the content of the data stored in it rather than by addressing predetermined locations, is programmable, which makes the pipelining processing even more flexible compared to processing in an ASIC.

Advantageously, the method comprises the steps of:
  creating a second program counter in a first stage, and
  creating a third program counter in a second stage. Hereby is achieved that conditional jumps are possible when a possible corresponding conditional jump instruction is executed in the first or the second stage.

The invention also relates to a processing means for processing pipelined data. The processing means comprises a storage means and at least one logic unit for executing operations on a block of data. The storage means comprises an instruction table comprising at least one instruction. The at least one logic unit is in at least one pipelined processing stage adapted to receive the block and a first instruction of the at least one instruction and execute at least one operation associated with the first instruction.

Suitably, the at least one logic unit in the at least one pipelined processing stage is adapted to receive at least one argument associated with the block and execute the at least one operation on the block, the at least one argument or both the block and the at least one argument.

Preferably, the instruction table comprises at least a second instruction. Hereby the option of using conditional jumps in during pipelined processing is achieved.

In a first aspect of the processing means according to the invention, the block is a PDU (Protocol Data unit), e.g. a part of an IP-packet. Hereby is achieved that the processing means may, for example, be used in an apparatus in a communications network, such as the Internet.

In a second aspect of the processing means, the block comprises a digital representation of an analogue signal sequence. Hereby is achieved that the processing means may be used for digital signal processing.

Suitably, the logic unit comprises an ALU and means for picking out a part or parts of the block.

Furthermore, the invention relates to a module for processing pipelined data. The module comprises a classification means for matching or identifying a block of data and a processing means for processing the block. The processing means comprises storage means and at least one logic unit for executing operations on the block, which is delivered from the classification means to the processing means. The classification means is adapted to send a program counter associated with the block to the processing means and the storage means comprises an instruction table comprising at least one instruction. The at least one logic unit is in at least one pipelined processing stage adapted to receive the block and a first instruction of the at least one instruction and execute at least one operation associated with the first instruction.

Suitably, the classification means is adapted to send at least one argument associated with the block to the processing means, and the at least one logic unit in the at least one pipelined processing stage is adapted to receive the at least one argument and execute the at least one operation on the block, the at least one argument, or both the block and the at least one argument.

In addition, the invention also relates to an integrated circuit, which comprises at least one module according to the above.

Moreover, the invention relates to a circuit board assembly, e.g. a line card adapted for a router. The circuit board assembly comprises at least one integrated circuit comprising at least one module according to the above.

Furthermore, the invention relates to a computer unit, such as network computer unit or a signal processing computer unit, comprising at least one integrated circuit, where the at least one integrated circuit comprises at least one module according to the above.

Also, the invention relates to a pipelined processing system, comprising a classification means for matching or identifying a block of data, a storage means and a processing means for processing the block. The processing means comprises at least one logic unit for executing operations on the block, which is delivered from the classification means to the processing means. The classification means is adapted to send a program counter associated with the block to the processing means and the storage means comprises an instruction table comprising at least one instruction. The at least one logic unit is in at least one processing stage adapted to receive the block and a first instruction of the at least one instruction and execute at least one operation associated with the first instruction.

BRIEF DESCRIPTION OF THE DRAWINGS

The objects, advantages and effects as well as features of the present invention will be more readily understood from the following detailed description of a preferred embodiment of the invention, as well as other embodiments, when read together with the accompanying drawings, in which:

FIG. 3 schematically shows an overview of the method of operation of a processing means according to the invention;

FIG. 4 shows in more detail two processing stages in the processing means according to FIG. 3;

DETAILED DESCRIPTION OF EMBODIMENTS

Figure 1:
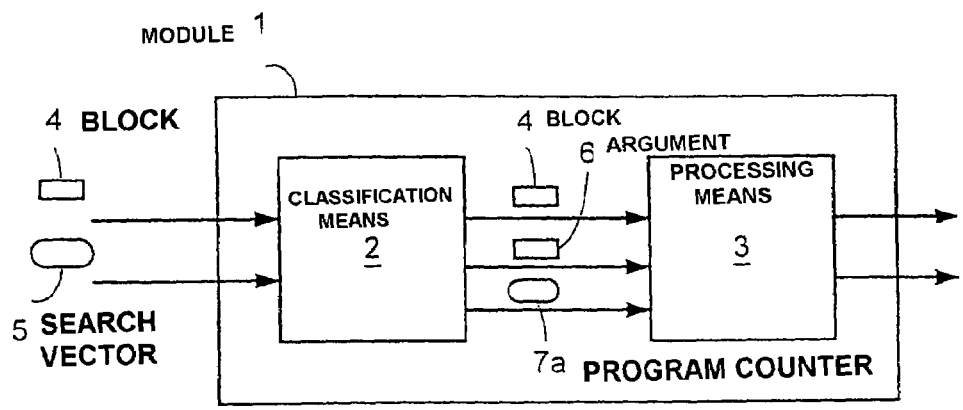
FIG. 1 schematically shows a module for pipelined processing of data according to the invention.

While the invention covers various modifications and alternative methods and systems, preferred embodiments of the invention are shown in the drawings and will hereinafter be described in detail. It is to be understood, however, that the specific description and drawings are not intended to limit the invention to the specific forms disclosed. On the contrary, it is intended that the scope of the claimed invention includes all modifications and alternative constructions thereof falling within the spirit and scope of the invention as expressed in the appended claims to the full range of their equivalents.

A module 1, which comprises a classification means 2 and a processing means 3 for pipelined processing according to the invention, is schematically illustrated in FIG. 1. A block 4 in the form of a PDU, such as a part of an IP-packet (Internet Protocol packet), is received by the classification means 2. A search vector 5 associated and retrieved from the block 4 is also received by the classification means 2. The block 4 is forwarded by the classification means 2 to the processing means 3 without changing the block 4. The processing means 3 also receives at least one argument 6 and a first program counter 7a from the classification means 2. Thereafter, the processing means 3 may perform different operations on the block 4, dependent on, for instance, the type of block that has been classified by the classification means. The processing means 3 sends out the changed or the unchanged block 4 from the module 1. For performing a desired task, several modules can be serially coupled to each other, thus creating an architecture of alternating classification means 2 and processing means 3. For the purpose of serially coupled modules, a second search vector (not shown) is created by the processing means and may be sent to a possible second, serially coupled module (not shown).

Figure 2:
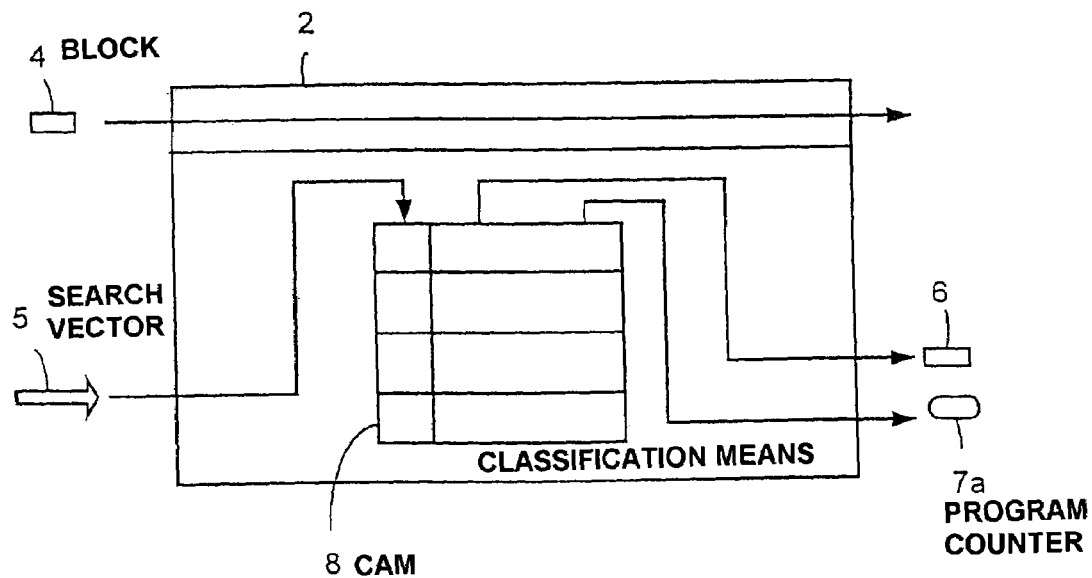
FIG. 2 illustrates the function of a classification means according to the invention.

The classification means 2 will now be described more in detail with reference to FIG. 2. Here the search vector 5 is compared to character strings in at least one column in an associative storage 8 (CAM=Content Addressable Memory). An associative storage is known to a person skilled in the art and is therefore not described more in detail. After the comparison, the first program counter 7a and the argument/arguments 6 corresponding to the search vector 5 are sent from the classification means 2 to the processing means 3. The block 4 is forwarded through the classification means 2 without being changed. The forwarding is delayed so as to send the block 4 to the processing means 3 substantially at the same time as the argument/arguments 6 and the first program counter 7a. Hereinafter, the description only refers to one argument 6, but it is to be understood that several arguments for each block could be sent, stored and edited in the processing means.

FIG. 3 schematically shows the basic method of operation of the processing means 3. Here, the processing of the pipelined blocks of data comprises five processing stages 9a–9e where each stage is processed in one clock cycle, but of course the pipelined processing in the processing means 3 may comprise down to only one stage or much more than five stages. The principles of pipelining are known to a person ordinary skilled in the art, and therefore only the processing of one block and its associated argument and program counters are described. Before and after each stage 9a–9e, input data and output data are stored in one register each, i.e. a small, high-speed computer circuit that holds values of internal operations. The top flow of the three, separated, parallel flows shown in FIG. 3 through the processing means 3, illustrates the processing of the block 4. The middle flow illustrates the processing of the associated argument 6 and the lowest flow illustrates the receiving of a program counter for every stage. As will be explained in the following, the block may be changed in each stage, the argument may be changed in each stage, and a new program counter is created in every new stage.

FIG. 4 shows the first two stages, 9a and 9b, of the five stages shown in FIG. 3. It is to be understood that the other three stages 9c–9e operate in the same principal way as the first two stages, 9a and 9b, and therefore have been left out. On the analogy of FIG. 3, the three types of flows described in connection with FIG. 3 are also shown in FIG. 4. The block 4 is received and stored in a first register 10a. At substantially the same time, the argument is received and stored in a second register 10b and the first program counter 7a is received and stored in a third register 10c. At the beginning of a clock tick, a logic unit 11 receives the block 4 and the argument 6 from the first and the second register respectively. The first program counter 7a is used for looking up a corresponding instruction stored in an editable, first instruction table 12a, which is comprised in a storage means included in the processing means 3. The first instruction table 12a comprises at least a first instruction 13a, but here the first instruction table 12a also is illustrated with a second and third instruction, 13b and 13c respectively. Of course the first instruction table 12a may comprise an arbitrary number of instructions. Each one of the instructions 13a–c comprises editable instruction fields (not shown). When an instruction corresponding to the first program counter 7a is found, the instruction is sent to the logic unit 11 for execution of operations corresponding to the instruction. In FIG. 4, the first instruction 13a corresponds to the first program counter 7a. Therefore, the first instruction 13a is sent to the logic unit 11 for execution of the operations corresponding to the first instruction 13a. An instruction field may for example comprise a jump condition instruction.

The logic unit 11 comprises means, i.e. a logic sub-unit, for creating new program counters and means for executing the operations associated to a received instruction. In the first stage in this example, the means for executing the operations and compute conditional jumps is an ALU (Arithmetic Logic Unit). An ALU is known to a person skilled in the art and is therefore not described more in detail. Examples of additional or alternative means for executing the operations are means for picking out a part or parts of the block, means for inserting data in a block, such as adding a new header to a packet, and a FPU (Floating Point Unit) for the handling of floating point operations. After the first instruction 13a has been received by the logic unit 11, the operations necessary for carrying out the first instruction 13a are executed. By way of example, the TOS (Type of Service) field in an IP-packet may be modified. The logic unit 11 is also able to edit the argument 6. Moreover, based on the block 4, the argument 6, the operations performed on the block 4 and/or the argument 6 and/or desired conditional jumps, the logic unit 11 creates a second program counter 7b. Before the clock tick, and thereby the first stage 9a, has ended, the changed or unchanged block 4 is stored in a fourth register 10d, the changed or unchanged argument 6 is stored in a fifth register 10e and the second program counter is stored in a sixth register 10f.

The second stage 9b during a subsequent clock tick works in a similar way as the first stage 9a. Here, a second logic unit 14 receives the modified or unmodified block 4 and argument 6 from the fourth and fifth register respectively. The second program counter 7b is compared with instructions in an editable, second instruction table 12b, which in FIG. 4 comprises three instructions: a fourth instruction 13d, a fifth instruction 13e and a sixth instruction 13f. Of course the instructions 13d–13f may be similar or identical to the instructions 13a–13c in the first instruction table 12a. In FIG. 4, the sixth instruction 13f corresponds to the second program counter 7b. Thus, the second logic unit 15 receives the sixth instruction 13f and executes the operations corresponding to the sixth instruction 13f on the received block 4 and/or argument 6 and sends the block 4 to a seventh register 10g and the argument 6 to an eighth register 10h. The second logic unit 14 also creates a third program counter 7c, which is sent and stored in a ninth register 10i.

As is indicated by FIG. 4, a new program counter is created in every new processing stage in the processing means 3. If a second module is serially coupled to the first module, a last argument of a first processing means is stored in a register and constitutes a search vector for a second classification means comprised in the second module. FIG. 4 also indicates the fact that editable instruction tables and different logic units, both in respect of physically different logic units and in respect of entirely or partly different types of components comprised in each logic unit, may be used for each one of the stages in the processing means 3. Alternatively, instead of using different logic units for each stage, some or all of the stages may share the same logic unit. Also enclosed by the invention is the use of only one editable instruction table for some or every stage in the processing means. However, such an embodiment may limit the processing speed. It must also be stated that an instruction may only instruct the execution of an operation that does affect neither the block 4, nor the argument 6. Such an instruction could be used, for example, when a block only has been identified as one that only has to be transported through a stage, some stages or the whole processing means.

Figure 5:
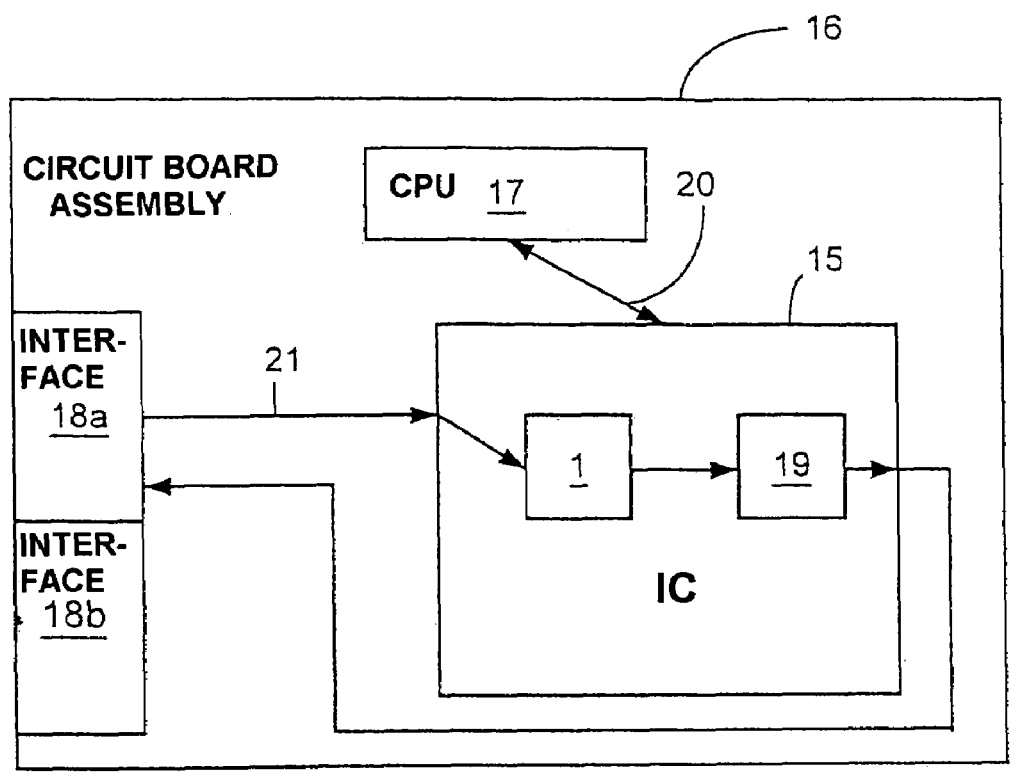
FIG. 5 shows a schematic view of a circuit board assembly according to an embodiment of the invention.

It shall be appreciated that the storage means comprising the editable instruction tables used by the processing means 3, may be comprised in the processing means 3 or outside of the processing means 3, but on the module 1, or integrated in an IC (Integrated Circuit) 15, which also comprises at least one module 1. A circuit board assembly 16 is schematically illustrated in FIG. 5. Here the circuit board assembly 16 comprises a local CPU 17, the IC 15 and a first and second interface device, 18a and 18b respectively. An example of an application for such a circuit board assembly is in computer units for firewall appliances. The IC 15 comprises the serially coupled first module 1 and a second module 19. As is illustrated by a double-headed arrow 20, the IC 15 is able to communicate with the local CPU 17 via a bus. A more detailed example of a communication between the IC 15 and the local CPU 17 is described later in connection to FIG. 7. Throughout the description, the local CPU 17 is of a type known to a person skilled in the art and is therefore not described more. An arrow 21 illustrates blocks coming in to the IC 15 from the first interface device 18*a*. The incoming blocks are processed by the serially coupled first and second module, 1 and 19, and then sent back to the first interface device 18*a*. Although not shown, blocks from the second interface device 18*b* may of course be processed in a similar way.

Figure 6:
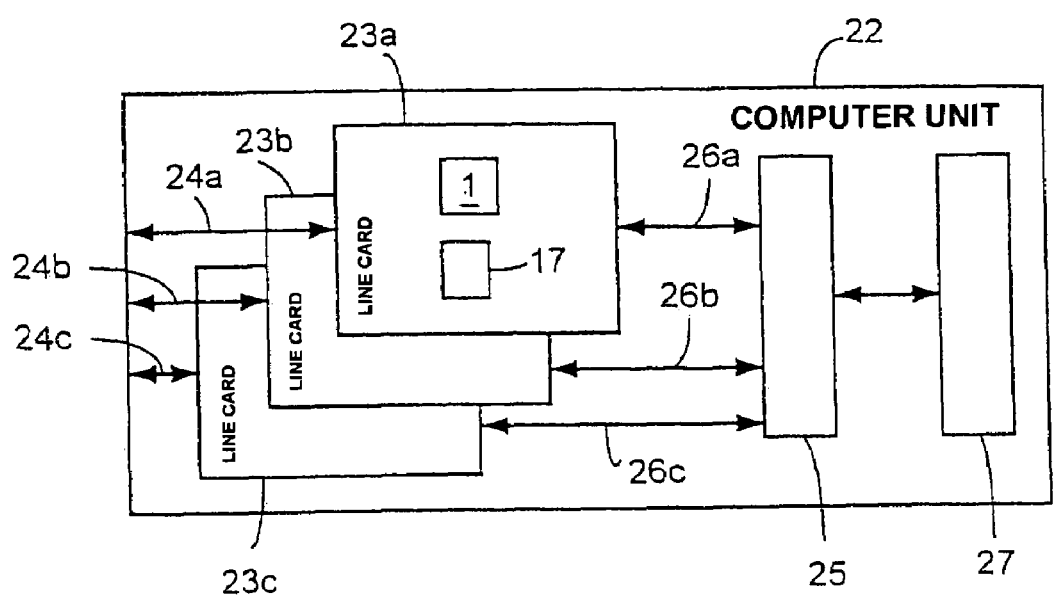
FIG. 6 schematically shows a router according to the invention.

An example of a computer unit 22 that comprises modules according to the invention will now be described. This example relates to a router, i.e. a computer that forwards packets from one LAN (Local Area Network) or WAN (Wide Area Network) to another. FIG. 6 schematically illustrates parts of a structure in the router, where several line cards, i.e. circuit board assemblies, each provided with a transmitting/receiving part for a particular protocol, are arranged. Here only three line cards 23*a*–23*c* are shown, but it may of course be more or less of them in the router. Each line card comprises at least one IC 15, which comprises at least one module 1 according to the invention. As also shown in FIG. 5, the local CPU 17 associated with every IC 15 may be positioned on each line card 23*a*–23*c*. For applications demanding fast processing of a lot of data, optical fibres are used for connecting the line cards 23*a*–23*c* to a communications network (not shown). Each line card 23*a*–23*c* therefore comprises a first set of ports, i.e. there are three sets of the first set of ports, which in FIG. 6 only are symbolised by the three lines 24*a*–24*c* with two arrowheads to the left of the line cards 23*a*–23*c*. The line cards communicate with each other through a switch fabric card 25, i.e. a card comprising the architecture used by the router for redirecting data coming in on one of the ports of the card out to another of its ports. Thus the switch fabric card 25 serves as a switch and junction for the line cards 23*a*–23*c*. Each line card 23*a*–23*c* comprises a second set of ports, i.e. there are three sets of the second set of ports in FIG. 6, for the communication with the switch fabric card. Each second set of ports is symbolised by lines 26*a*–26*c* with two arrowheads between the associated line card 23*a*–23*c* and the switch fabric card 25. A device 27 is for example used for computing routing tables, i.e. database tables in the router that contain information of a current communications network. Through the device 27, a provider of the IC 15 may update the instructions in the editable instruction tables 12*a*–12*b* disclosed above. However, the updating is not a part of this invention and therefore not described more in detail.

Figure 7:
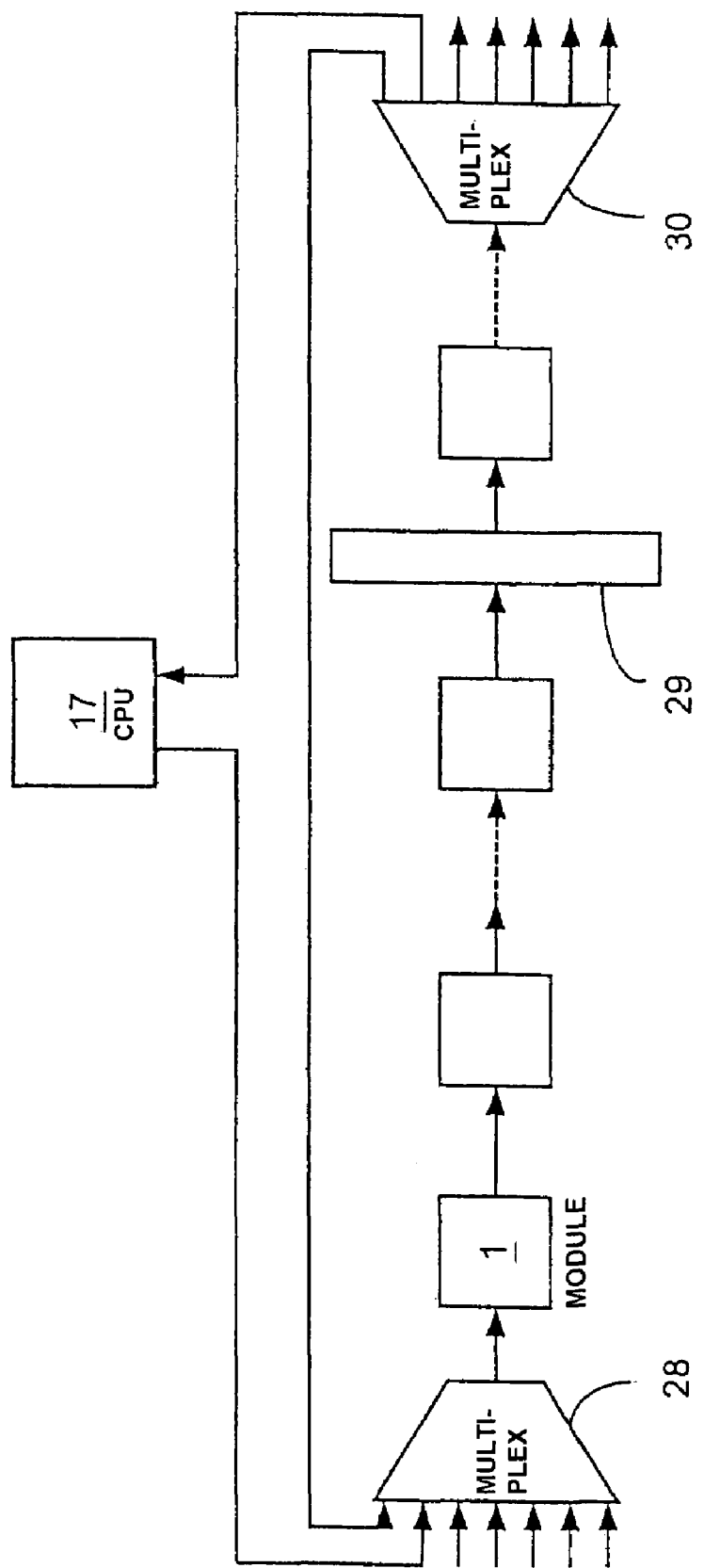
FIG. 7 shows a schematic block diagram of components on a line card according to the invention.

FIG. 7 schematically shows an example of a circuit architecture on one of the line cards 23*a*–23*c*, which includes a plurality of modules according to the invention. Here, the first set of ports is connected to a multiplexor 28. A plurality of modules are serially coupled to the multiplexor 28 and lead to a unit 29 for operations such as queuing, scheduling and shaping. These operations are known to a person skilled in the art and are not a part of this invention. Additional modules follow after the unit 29, before the pipelined packets are delivered to an inverse multiplexor 30 and out via the second set of ports, which correspond to the first set of ports. A feed-back to the multiplexor 28 may also be done. Furthermore, the packets may be forwarded from the inverse multiplexor 30 to the local CPU 17 for processing. Also, the CPU 17 may send packets to the multiplexor 28.

Examples of tasks, which may be performed in one of the modules in FIG. 7, are:

decoding different types of packets, such as ATM-cells and Ethernet packets;

firewalling for determining if a packet shall be forwarded to a subsequent module or filtered out;

firewalling in order to only forward certain types of packets from the line card;

traffic conditioning, i.e. measuring the length of the incoming packet and having a condition that may be that only a certain amount of data is allowed to be forwarded to a certain address in the communications network and where all data above a limit is thrown away;

forwarding the packet to another line card using the routing table;

queue priority identification, for instance in the case where different packets have different priorities regarding fast transmission through the communications network; and adding or removing a header to or from an incoming packet.

The processing means 3, the method for the processing means 3 and the module 1 described above is of course applicable to all kinds of computer units, other than the router and computer units for firewall appliances described above, where the computer units would benefit from pipelining. Examples of such computer units are network computer units such as: switches; gateways, i.e. computer units that perform protocol conversion between different types of networks and applications; and load balancing units for Web-servers.

The invention is also applicable for computer units involved in digital signal processing, i.e. the analysing and/or modifying of signals from sources such as sound, weather satellites and earthquake monitors. The block 4 of data received by a module 1 may in this case be a digital representation of an analogue signal sequence. Fields where digital signal processing in connection with the invention is used, are e.g. biomedicine, sonar, radar, seismology, speech and music processing, imaging and communications.

The invention claimed is:

1. A method for pipelined processing, comprising a plurality of pipelined processing stages and wherein the method comprising the steps of:

receiving a block (4) in a first logic unit (11) in a processing means (3);

looking up a first instruction (13*a*) corresponding to a first program counter (7*a*), associated with the block (4) in a first instruction table (12*a*) comprising at least the first instruction (13*a*);

executing at least one operation associated with the first instruction (13*a*) in the first logic unit (11);

creating in the first logic unit (11) a second program counter (7*b*), associated with the block (4);

receiving the block (4) in a second logic unit (14) in the processing means (3);

looking up a further instruction (13*f*) corresponding to the second program counter (7*b*) in a second instruction table (12*b*) comprising at least the further instruction (13*f*); and executing at least one operation associated with the further instruction (13*f*) in the second logic unit (14).

2. A method according to claim 1, wherein the at least one pipelined processing stage comprises the step of:

receiving at least one argument (6) in the first logic unit (11), where the at least one argument (6) is associated with the block (4); and the executing of the at least one operation in the first logic unit (11) is performed on the at least one argument (6), the block (4) or both the at least one argument (6) and the block (4).

3. A method according to claim 2, comprising the steps of:
receiving a search vector (5) associated with the block (4) in a classification means (2);
comparing the search vector (5) with data stored in an associative storage (8), the data comprising the first program counter (7a) and the at least one argument (6); and
sending the at least one argument (6) and the first program counter (7a) to the processing means (3) before any of the stages of the plurality of pipelined processing stages.

4. A method according to claim 1, comprising the steps of:
creating a second program counter (7b) in a first stage (9a), and
creating a third program counter (7c) in a second stage (9b).

5. A processing means (3) for processing pipelined data, comprising or connected to a storage means and comprising a plurality of logic units (11, 14) for executing operations on a block (4) of data, wherein the storage means comprises a plurality of instruction tables (12a, 12b), each comprising at least one instruction, and wherein a first logic unit (11) is connected to a first register (10a) for storing a block of data, a register for storing a first program counter is connected to a first instruction table (12a), the first instruction table is connected to the first logic unit (11), the first logic unit (11) is connected to a further register (10d) for storing the block of data, and to a further register (10f) for storing a second program counter, a second logic unit (14) is connected to the further register (10d) for storing the block of data, the further register (10f) for storing a second program counter is connected to a second instruction table, and the second instruction table (12b) is connected to the second logic unit (14).

6. A processing means (3) according to claim 5, wherein the first logic unit is connected to a register for storing at least one argument associated with the block of data.

7. A processing means (3) according to claim 5, wherein at least one of the instruction tables (12a) also comprises at least a second instruction (13b).

8. A processing means (3) according to claim 5, wherein the block (4) is a PDU, e.g. a part of an IP-packet.

9. A processing means (3) according to claim 5, wherein the block (4) comprises a digital representation of an analogue signal sequence.

10. A processing means (3) according to claim 5, wherein at least one of the logic units (11) comprises an ALU.

11. A processing means (3) according to claim 10, wherein the first logic unit (11) comprises means for picking out a part or parts of the block (4).

12. A module (1) for processing pipelined data, comprising a classification means (2) for matching or identifying a block (4) of data and a processing means (3) for processing the block (4), the processing means (3) connected to storage means and comprising at least two logic units (11) for executing operations on the block (4), which is delivered from the classification means (2) to the processing means (3), wherein the processing means comprises a first register for storing a program counter, the classification means being connected to the first register for storing a program counter,
the storage means comprises a first instruction table (12a) comprising at least one instruction,
a first logic unit (11) is connected to a first register (10a) for storing the block,
the first register for storing a first program counter is connected to the first instruction table,
the first instruction table is connected to the first logic unit,
the first logic unit is connected to a further register (10d) for storing the block of data, and to a further register (10f) for storing a second program counter,
a second logic unit (14) is connected to the further register (10d) for storing the block of data,
the further register (10f) for storing a second program counter is connected to a second instruction table (12b), wherein the second instruction table is connected to the second logic unit (14).

13. A module (1) according to claim 12, wherein the processing means comprises a register for storing at least one argument, the classification means being connected to the register for storing at least one argument, and the at least one logic unit (11) in the at least one pipelined processing stage is connected to a register for storing the at least one argument.

14. An integrated circuit (15), characterised by at least one module (1) according to claim 12.

15. A circuit board assembly (16), such as a line card (23a) adapted for a router, having at least one integrated circuit (15) comprising at least one module (1) for processing pipelined data, wherein said module comprising a classification means (2) for matching or identifying a block (4) of data and a processing means (3) for processing the block (4), the processing means (3) being connected to storage means and comprising at least two logic units (11) for executing operations on the block (4), which is delivered from the classification means (2) to the processing means (3), and wherein
the processing means comprises a first register (10c) for storing a program counter, the classification means being connected to the first register for storing a program counter,
wherein the storage means comprises a first instruction table (12a) comprising at least one instruction,
a first logic unit (11) is connected to a first register (10a) for storing the block, the first register for storing a first program counter is connected to the first instruction table (12a), the first instruction table (12a) is connected to the first logic unit (11), the first logic unit is connected to a further register (10d) for storing the block of data, and to a further register (10f) for storing a second program counter, and
a second logic unit (14) is connected to the further register (10d) for storing the block of data, the further register (10f) for storing a second program counter is connected to a second instruction table (12b), wherein the second instruction table is connected to the second logic unit (14).

16. A computer unit (22), such as network computer unit or a signal processing computer unit, comprising at least one integrated circuit (15), wherein the at least one integrated circuit (15) comprises at least one module (1) according to claim 12.

17. A pipelined processing system, comprising a classification means (2) for matching or identifying a block (4) of data, a storage means and a processing means (3) for processing the block (4), the processing means (3) being connected to storage means and comprising at least two logic units (11) for executing operations on the block (4), which is delivered from the classification means (2) to the processing means (3), wherein,
the processing means comprises a first register for storing a program counter, the classification means being connected to the first register for storing a program counter, the storage means comprises a first instruction table (12*a*) comprising at least one instruction, a first logic unit (11) is connected to a first register for storing the block, the first register for storing a first program counter is connected to the first instruction table (12*a*), the first instruction table (12*a*) is connected to the first logic unit (11), the first logic unit is connected to a further register (10*d*) for storing the block of data, and to a further register (10*f*) for storing a second program counter, a second logic unit (14) is connected to the further register (10*d*) for storing the block of data, the further register (10*f*) for storing a second program counter is connected to a second instruction table (12*b*), and the second instruction table (12*b*) is connected to the second logic unit (14).

18. A pipelined processing system according to claim 17, wherein the processing means comprises a register for storing at least one argument, the classification means being connected to the register for storing at least one argument, and the at least one logic unit (11) in the at least one processing stage is connected to a register for storing the at least one argument.

\* \* \* \* \*